United States Patent
Tang et al.

(10) Patent No.: US 8,326,510 B2
(45) Date of Patent: Dec. 4, 2012

(54) METHOD AND APPARATUS FOR CONTROLLING OUTPUT TORQUE OF A MOTOR FOR AN ELECTRIC VEHICLE IN DOWNHILL MODE

(75) Inventors: Xiaohua Tang, Guangdong (CN); Xuguang Zhou, Guangdong (CN); Yingwu Xu, Shanghai (CN); Jian Gong, Shanghai (CN); Nan Liu, Guangdong (CN); Guangming Yang, Guangdong (CN)

(73) Assignee: BYD Co. Ltd. (CN)

( * ) Notice: Subject to any disclaimer, the term of this patent is extended or adjusted under 35 U.S.C. 154(b) by 775 days.

(21) Appl. No.: 12/521,032

(22) PCT Filed: Dec. 26, 2007

(86) PCT No.: PCT/CN2007/071334
§ 371 (c)(1),
(2), (4) Date: Aug. 21, 2009

(87) PCT Pub. No.: WO2008/077351
PCT Pub. Date: Jul. 3, 2008

(65) Prior Publication Data
US 2010/0004808 A1      Jan. 7, 2010

(30) Foreign Application Priority Data

Dec. 26, 2006   (CN) .......................... 2006 1 0157731

(51) Int. Cl.
*G06F 7/00* (2006.01)
*G06F 17/00* (2006.01)
(52) U.S. Cl. ................. 701/84; 701/22; 701/54; 701/82; 477/181; 180/197; 180/65.1

(58) Field of Classification Search ............... 701/22, 701/82, 84; 180/65.1, 197, 65.28; 477/5–6, 477/181
See application file for complete search history.

(56) References Cited

U.S. PATENT DOCUMENTS 5,457,363 A * 10/1995 Yoshii et al. .................. 318/432
(Continued)

FOREIGN PATENT DOCUMENTS

CN           1778601 A      5/2006
(Continued)

OTHER PUBLICATIONS

A study on mental model for inferring driver's intention; Takahashi, H.; Kuroda, K.; Decision and Control, 1996., Proceedings of the 35th IEEE; vol. 2; Digital Object Identifier: 10.1109/CDC.1996.572826; Publication Year: 1996 , pp. 1789-1794 vol. 2.*

(Continued)

*Primary Examiner* — Cuong H Nguyen
(74) *Attorney, Agent, or Firm* — Brinks Hofer Gilson & Lione

(57) ABSTRACT

A method and an apparatus for controlling output torque of a motor for an electric vehicle in downhill mode comprises following steps: detecting a tilt angle value θ, a current vehicle speed value V and an accelerator-pedal travel value Gain of the vehicle, determining whether the vehicle is in downhill mode or not, and if the result is positive, then calculating a downhill slip torque T1 of the vehicle under the tilt angle value θ, obtaining a maximum output torque T2, calculating an output torque T of the motor based on T1, T2, Gain and a given vehicle speed delimitative value $V_{ref}$, and controlling the motor to output the calculated output torque T. The present invention ensures the vehicle speed not too high by controlling the output torque of an electric vehicle in downhill mode, even if the brake-pedal travel is zero.

13 Claims, 4 Drawing Sheets

U.S. PATENT DOCUMENTS

| | | | | |
|---|---|---|---|---|
| 5,793,175 | A | * | 8/1998 | Journey .................. 318/493 |
| 6,377,007 | B1 | * | 4/2002 | Ozaki et al. .............. 318/432 |
| 7,974,756 | B2 | * | 7/2011 | Ikari ........................ 701/50 |
| 2002/0088653 | A1 | | 7/2002 | Takamoto et al. |
| 2009/0112386 | A1 | * | 4/2009 | Saitoh et al. .............. 701/22 |
| 2009/0326769 | A1 | * | 12/2009 | Oshima et al. ............ 701/51 |
| 2009/0326777 | A1 | * | 12/2009 | Oshima et al. ............ 701/83 |
| 2009/0326779 | A1 | * | 12/2009 | Oshima et al. ............ 701/86 |
| 2010/0004808 | A1 | * | 1/2010 | Tang et al. ................ 701/22 |
| 2010/0030415 | A1 | * | 2/2010 | Tang ......................... 701/22 |
| 2011/0048829 | A1 | * | 3/2011 | Matsumoto et al. ...... 180/197 |

FOREIGN PATENT DOCUMENTS

| | | | |
|---|---|---|---|
| CN | 1829625 A | | 9/2006 |
| FR | 2756521 A1 | | 6/1998 |
| JP | 3608799 B2 | | 1/2005 |
| JP | 2005-257882 | * | 9/2005 |
| JP | 2005-372615 | * | 12/2005 |
| KR | 2004028374 A | * | 4/2004 |
| WO | PCT/JP2006/317160 | * | 3/2008 |

OTHER PUBLICATIONS

Traction control of Hybrid Electric Vehicle; Li Shoubo; Liao Chenglin; Chen Shanglou; Wang Lifang; Vehicle Power and Propulsion Conference, 2009. VPPC '09. IEEE; Digital Object Identifier: 10.1109/VPPC.2009.5289563; Publication Year: 2009 , pp. 1535-1540.*

Sensory pedal based drive assist of an electric vehicle by impedance control considering environment variation; Jimbo, Daisuke; Murakami, Toshiyuki; IECON 2011—37th Annual Conference on IEEE Industrial Electronics Society; Digital Object Identifier: 10.1109/IECON.2011.6119401; Publication Year: 2011 , pp. 734-739.*

Anti-skid for Electric Vehicles based on sliding mode control with novel structure; Kun Xu; Guoqing Xu; Weimin Li; Linni Jian; Zhibin Song; Information and Automation (ICIA), 2011 IEEE International Conference on; Digital Object Identifier: 10.1109/ICINFA.2011.5949074; Publication Year: 2011 , pp. 650-655.*

International Search Report dated Mar. 27, 2008 issued in PCT/CN2007/071334.

* cited by examiner

METHOD AND APPARATUS FOR CONTROLLING OUTPUT TORQUE OF A MOTOR FOR AN ELECTRIC VEHICLE IN DOWNHILL MODE

CROSS-REFERENCE TO RELATED APPLICATIONS

This application is a national phase application of PCT Application No. PCT/CN2007/071334 filed Dec. 26, 2007, which claims priority from Chinese Patent Application No. 2006-10157731.2, filed Dec. 26, 2006, both contents of which are incorporated herein by reference in their entirety.

FIELD OF INVENTION

The present invention relates to a method and apparatus for controlling output torque of a motor for an electric vehicle, and more particularly, to a method and apparatus for controlling output torque of a motor for an electric vehicle in downhill mode.

BACKGROUND

The conventional fuel vehicle adopts an engine as the power output source, when it is in downhill mode and its gear position is at forward gear, due to the speed control of the engine, if the vehicle speed is too high, the engine may automatically reduce the quantity of fuel injected, and the mechanical friction may generate a reverse towing and braking torque, so the vehicle speed will not be too fast. And most of the electric vehicles adopt the torque controlled motor as the power output source, and the motor controller may calculate the output torque of the motor according to the equation $T=T_2 \times Gain$, and control the motor to drive the wheels of the vehicle by using the torque T, in order to ensure the vehicle reachs the required speed. Wherein T is the output torque of the motor, $T_2$ is the maximum output torque of the motor under the current vehicle speed of the vehicle, Gain is the accelerator-pedal travel value which is in the range of 0%~100%, and the value of Gain is proportional to the step depth of the accelerator pedal. When the vehicle is in downhill mode, $T_2$ will be increased with the increasing of the vehicle speed, even if Gain is constant, the output torque T may also be increased. When its speed is too high, the friction of motor is inadequate to form the reverse brake, it may cause the vehicle speed too high, and then the vehicle is out-of-control, and serious accidents caused.

SUMMARY OF INVENTION

The main purpose of the present invention is to solve the problems mentioned above, put forward a method and apparatus for controlling output torque of a motor for an electric vehicle in downhill mode in order to ensure the electric vehicle to control the output torque of motor in downhill mode according to the vehicle conditions just then, without stepping the accelerator pedal or the brake pedal, the vehicle speed may also be controlled, not too high, thus improve the vehicle's safety and maneuverability.

The secondary purpose of the present invention is to put forward a method and apparatus for controlling output torque of a motor for an electric vehicle with a low speed in downhill mode to output a low reverse moment to ensure the vehicle increase its speed to a preset speed stably.

In order to realize the purpose mentioned above, the present invention provides a method for controlling output torque of a motor for an electric vehicle in downhill mode, comprising the following steps:

S1) detecting a tilt angle value θ, a current vehicle speed value V and an accelerator-pedal travel value Gain of the vehicle;

S2) determining whether the vehicle is in downhill mode or not, and if yes going to step S3, otherwise going to step S4;

S3,) calculating a downhill slip torque $T_1$ of the vehicle under the tilt angle value θ, obtaining a maximum output torque $T_2$ of the motor under the current vehicle speed value V, calculating an output torque T of the motor based on the downhill slip torque $T_1$, the maximum output torque $T_2$ of the motor under the current vehicle speed value V, the accelerator-pedal travel value Gain and a given vehicle speed delimitative value $V_{ref}$, and going to step S5;

S4) obtaining a maximum output torque $T_2$ of the motor under the current vehicle speed value V, calculating an output torque T of the motor based on the maximum output torque $T_2$ of the motor under the current vehicle speed value V and the accelerator-pedal travel value Gain, and going to step S5; and S5) controlling the motor to output the calculated output torque T.

Wherein in step S3 the downhill slip torque $T_1$ is calculated according to the following equation:

$$T_1 = mg\sin\theta \times \frac{r}{k},$$

wherein m is total mass of the vehicle, g is the gravity acceleration, θ is the tilt angle value of the vehicle, r is radius of the wheels and k is a variable transmission ratio of the gearbox. And the maximum output torque $T_2$ of the motor may be obtained from the external performance curve of the motor under the current vehicle speed value V.

In step S3 further comparing the current vehicle speed value V with the given vehicle speed delimitative value $V_{ref}$, and calculating the output torque T of the motor according to the result of comparison and the following equation:

$$T = \begin{cases} -T_1 + T_2 \times \text{Gain}, & \text{if } V > V_{ref} \\ -T_3 + T_2 \times \text{Gain}, & \text{if } V \leq V_{ref}, \end{cases}$$

wherein $$T_3 = \frac{V}{V_{ref}} \times T_1,$$

and the given vehicle speed delimitative value $V_{ref}$ is preferably 30 km/h.

In step S2, determining the vehicle is in downhill mode when the detected tilt angle value θ is negative and the current vehicle speed value V is positive.

In step S1 further detecting a current gear position of the vehicle, and in step S2, besides determining whether the vehicle is in downhill mode or not, further determining whether the current gear position is at forward gear or not, if the vehicle is in downhill mode and the current gear position is at forward gear, then going to step S3, otherwise going to step S4.

In order to realize the purpose mentioned above, the present invention still provides an apparatus for controlling output torque of a motor for an electric vehicle in downhill mode, comprising: an angle sensor, for detecting tilt angle of the vehicle and outputting a tilt angle signal to a motor controller; a vehicle speed sensor, for detecting current speed of the vehicle and outputting a vehicle speed signal to the motor controller; an accelerator-pedal position sensor, for detecting position of the accelerator-pedal and outputting an accelerator-pedal position signal to the motor controller; the motor controller, configured to:

receive the tilt angle signal, the vehicle speed signal and the accelerator-pedal position signal, obtain a tilt angle value θ, a current vehicle speed value V and an accelerator-pedal travel value Gain for the vehicle based on the signals, determine whether the vehicle is in downhill mode or not:

if the vehicle is in downhill mode, then calculate a downhill slip torque $T_1$ of the vehicle under the tilt angle value θ, obtain a maximum output torque $T_2$ of the motor under the current vehicle speed value V, calculate an output torque T based on the downhill slip torque $T_1$, the maximum output torque $T_2$ of the motor, the accelerator-pedal travel value Gain and a given vehicle speed delimitative value $V_{ref}$; or if the vehicle is not in downhill mode, then obtain a maximum output torque $T_2$ of the motor under the current vehicle speed value V, calculate an output torque T based on the maximum output torque $T_2$ of the motor and the accelerator-pedal travel value Gain; and generate a control signal for controlling the motor to output the calculated output torque T.

Wherein the motor controller is further configured to calculate the downhill slip torque T, according to the following equation:

$$T_1 = mg\sin\theta \times \frac{r}{k},$$

wherein m is total mass of the vehicle, g is the gravity acceleration, θ is the tilt angle value of the vehicle, r is radius of the wheels and k is a variable transmission ratio of the gearbox. The maximum output torque $T_2$ may be obtained from the external performance curve of motor under the current vehicle speed value V.

Furthermore, the apparatus comprises a vehicle speed monitoring unit, and the vehicle speed sensor further outputs the vehicle speed signal to the vehicle speed monitoring unit, which is configured to receive the vehicle speed signal, obtain the current vehicle speed value V based on the signal, compare the current vehicle speed value V with the given vehicle speed delimitative value $V_{ref}$, and output a first control signal to the motor controller if the current vehicle speed value V is greater than the given vehicle speed delimitative value $V_{ref}$, or output a second control signal to the motor controller if the current vehicle speed value V is less than or equal to the given vehicle speed delimitative value $V_{ref}$.

Then the motor controller is further configured to, in case of determining the vehicle is in downhill mode, calculate the output torque T of the motor according to the equation $T=-T_1+T_2\times Gain$ when receiving the first control signal, and calculate the output torque T of the motor according to the equation $T=-T_3+T_2\times Gain$ when receiving the second control signal, wherein $$T_3 = \frac{V}{V_{ref}} \times T_1.$$

The given vehicle speed delimitative value $V_{ref}$ is preferably 30 km/h.

The present invention also provides the apparatus, wherein it further comprises a driving mode monitoring unit, and the angle sensor and the vehicle speed sensor output the tilt angle signal and the vehicle speed signal to the driving mode monitoring unit respectively, which is configured to receive the tilt angle signal and the vehicle speed signal, obtain the tilt angle value θ and the current vehicle speed value V based on the signals, determine the vehicle is in downhill mode when the tilt angle value θ is negative and the current speed value V is positive, and output a fourth control signal to the vehicle speed monitoring unit; and wherein the vehicle speed monitoring unit is further configured to be actived for operating when receiving the fourth control signal.

The present invention provides the apparatus, wherein it further comprises a gear position sensor, for detecting gear position of the vehicle and outputting a gear position signal to a gear position detecting unit; and the gear position detecting unit, for receiving the gear position signal, obtaining a current gear position based on the gear position signal, determining whether the current gear position is at forward gear, and outputting a third control signal to the vehicle speed monitoring unit if the current gear position is at forward gear; and wherein the vehicle speed monitoring unit is further configured to be actived for operating when receiving the third control signal and the fourth control signal at the same time.

According to the method and apparatus provided in the present invention, due to as rotating, the motor may not only output a forward torque, but also output a backward torque, when detected that the vehicle is in downhill mode, the present invention may calculate a downhill slip torque $T_1$ of the vehicle in downhill mode according to the current vehicle speed value V and total mass, and calculate a output torque T of the motor according to the accelerator-pedal travel value Gain and the current vehicle speed V, and a given vehicle speed delimitative value $V_{ref}$. In the output torque of motor, the downhill slip torque of vehicle shall be considered. When the vehicle speed is very high, outputting a reverse torque, the output torque and the downhill slip torque of vehicle due to total mass of motor in the forward direction may be added together, to obtain the final torque for wheels, even if the brake depth is 0%, without stepping on the pedals of accelerator or brake, the torque outputted by the motor may ensure the vehicle speed not too high, thus improve the vehicle safety and comfort. At the case of low speed in downhill mode, controlling a lower reverse torque outputted by the motor may ensure the vehicle to speedup to a specified value stably.

BRIEF DESCRIPTIONS OF THE DRAWINGS

The features and advantages of the present invention may be detailed through the embodiment and combined with the attached figures, in which.

DETAILED DESCRIPTION OF THE PREFERRED EMBODIMENTS

Figure 1:
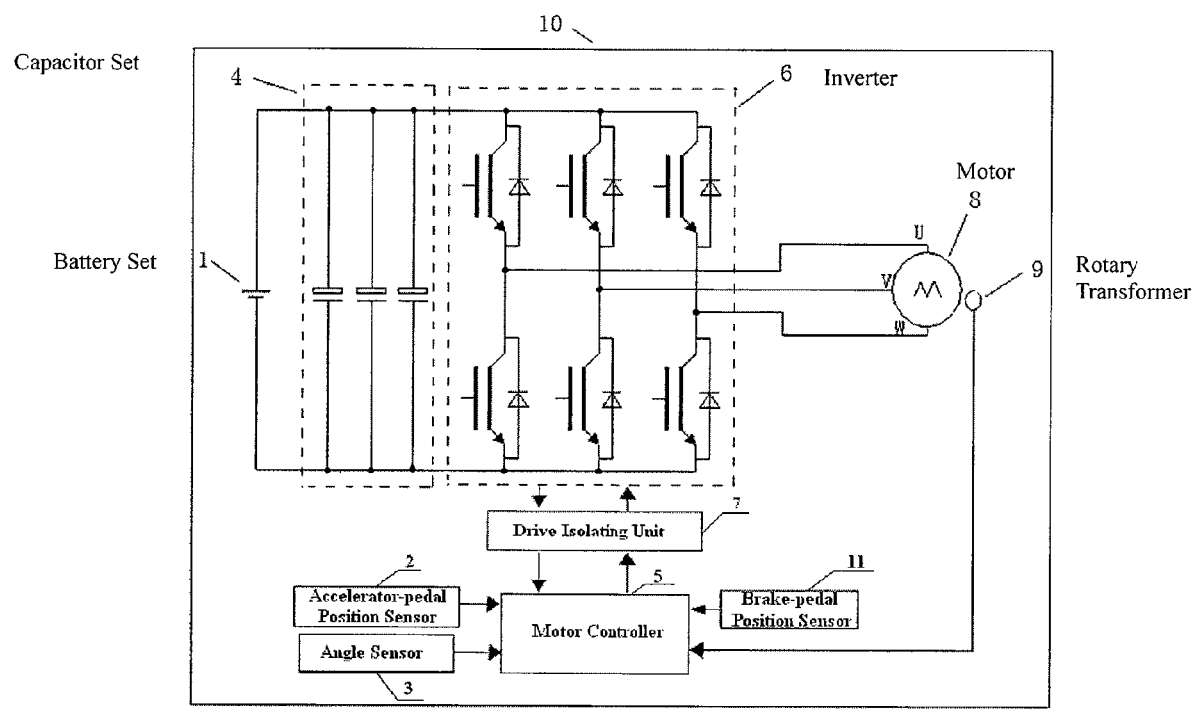
FIG. 1 is a simplified structural view of an electric drive system for an electric vehicle according to an embodiment in the present invention.

FIG. 1 is a simplified structural view of an electric drive system 10 for an electric vehicle in an embodiment of the present invention. Shown as FIG. 1, the electric vehicle electric drive system 10 comprises a battery set 1, an accelerator-pedal position sensor 2, an angle sensor 3, a capacitor set 4, a motor controller 5, an inverter 6, a drive isolating unit 7, a motor 8, a rotary transformer 9 and a brake-pedal position sensor 11.

Wherein the battery set 1 may adopt the high power battery set, the voltage of which is 200V~330V, and the battery set 1 is the energy for the whole electric drive system. The accelerator-pedal position sensor 2 and the brake-pedal position sensor 11 are installed at the places as that for conventional vehicles, for detecting and sending an accelerator-pedal position signal and a brake-pedal position signal to the motor controller 5 respectively. The angle sensor 3 is installed on the chassis of the whole vehicle, for detecting and outputting a tilt angle signal to the motor controller 5. In particular, when the motor controller 5 receives the angle signals, firstly smoothing the angle signals to remove the interference in the signals, and then determining whether the vehicle is in downhill mode based on the processed angle signals. The positive pole of capacitor set 4 is connected with the positive bus of the battery set 1, and its negative pole is connected with the negative bus of the battery set 1, for absorbing the high frequency surge voltage and smoothing the DC voltage waveform. The motor controller 5 is for calculating Pulse Width Modulation (PWM) signals and sending them to the inverter 6 through the drive isolating unit 7. The inverter 6 comprises three intelligent power modules (IPM), or such power devices as IGBT and transistor etc. Each IPM has the upper and lower arm, and the input terminal of upper arms of three IPMs may be connected with the positive bus of the battery set 1, while their lower arms may be connected with the negative bus of the battery set 1. All contacts of IPMs shall be respectively connected with 3-phase coils (i.e. U-phase, V-phase, and W-phase) of the motor 8. The motor 8 is a permanent-magnet synchronous motor, as the power output source of electric vehicle. The rotary transformer 9 is for detecting the rotating angle of rotor of motor 8, and sending to the motor controller 5 after a revolving decoding unit (not shown) decoding. The rotary transformer 9 and the revolving decoding unit can used as a vehicle speed sensor, and the current vehicle speed V could be calculated according to the positions of the rotor. Certainly, an individual vehicle speed sensor may be used.

The principle of the present invention is based on calculating the torque T to be outputted to the wheels from the motor in downhill mode according to the equivalent downhill slip torque $T_1$ due to the gravity in the forward direction of the vehicle and the accelerator-pedal travel value Gain corresponding to the pedal depth stepped by the driver, the current vehicle speed value V and the given vehicle speed delimitative value $V_{ref}$. The motor controller 5 of electric vehicle electrical system 10 may calculate the equivalent downhill slip torque $T_1$ due to the gravity of the vehicle in the forward direction under the tilt angle value θ according to the detected tilt angle value angle θ of the vehicle from the angle sensor 3, combined with total mass m and the current vehicle speed value V, and obtain the maximum output torque $T_2$ under the current vehicle speed V (i.e., the torque output by the motor when the accelerator-pedal travel value is maximum). Based on these calculations and according to the accelerator-pedal travel value Gain, the current vehicle speed value V and the given vehicle speed delimitative value $V_{ref}$, determining the torque addition item, and adding the maximum output torque $T_2$ of the motor and the downhill slip torque $T_1$ to acquire the final output torque T of the motor. Thus the output torque of the motor may allow for the gravity-equivalent downhill slip torque addition item, and be added with $T_1$ to obtain the final torque for the wheels.

The detail embodiment of the above solution will be explained referring to the method provided in the present invention.

Figure 2:
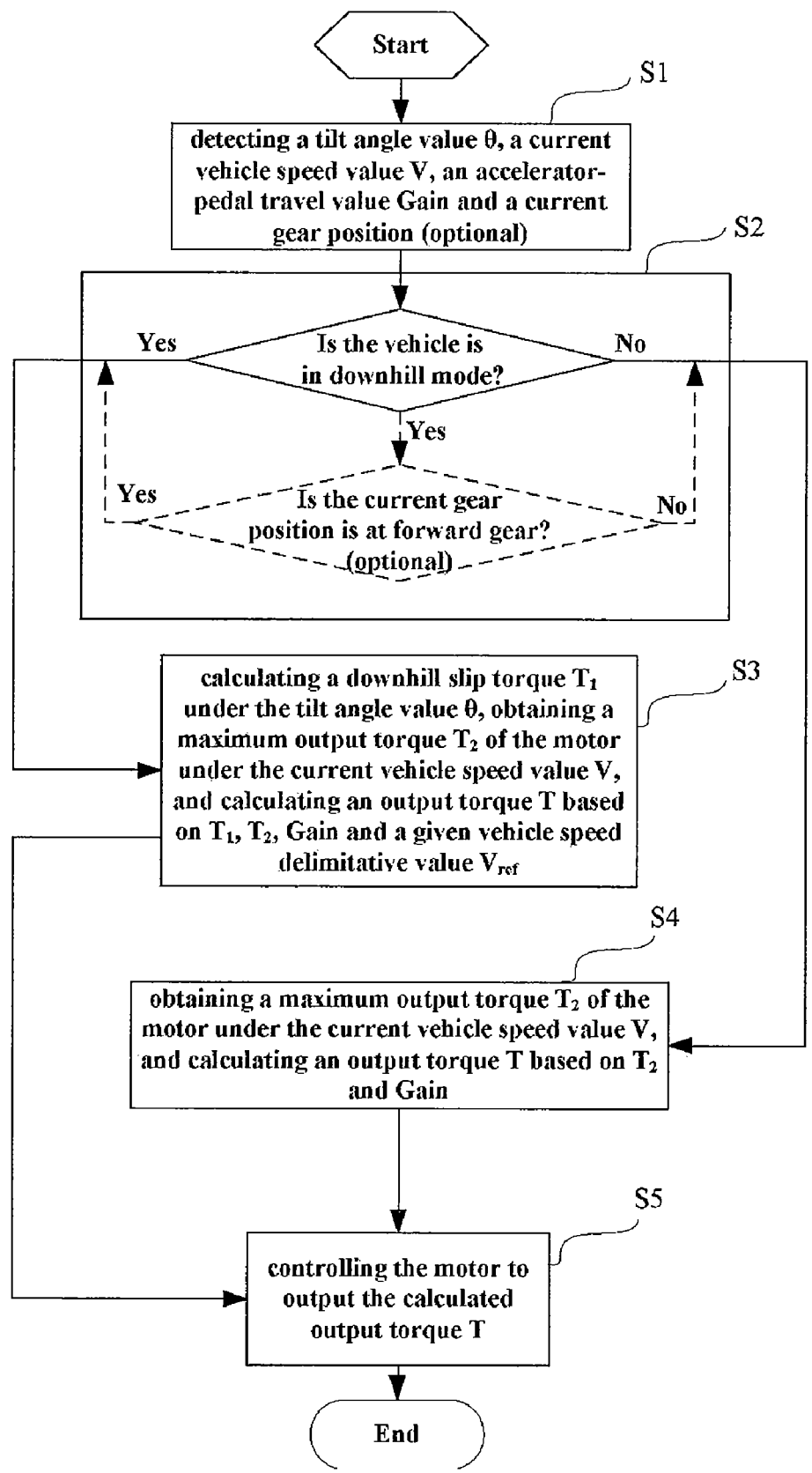
FIG. 2 is a flow chart of the method for controlling output torque of a motor according to an embodiment in the present invention.
Figure 4:
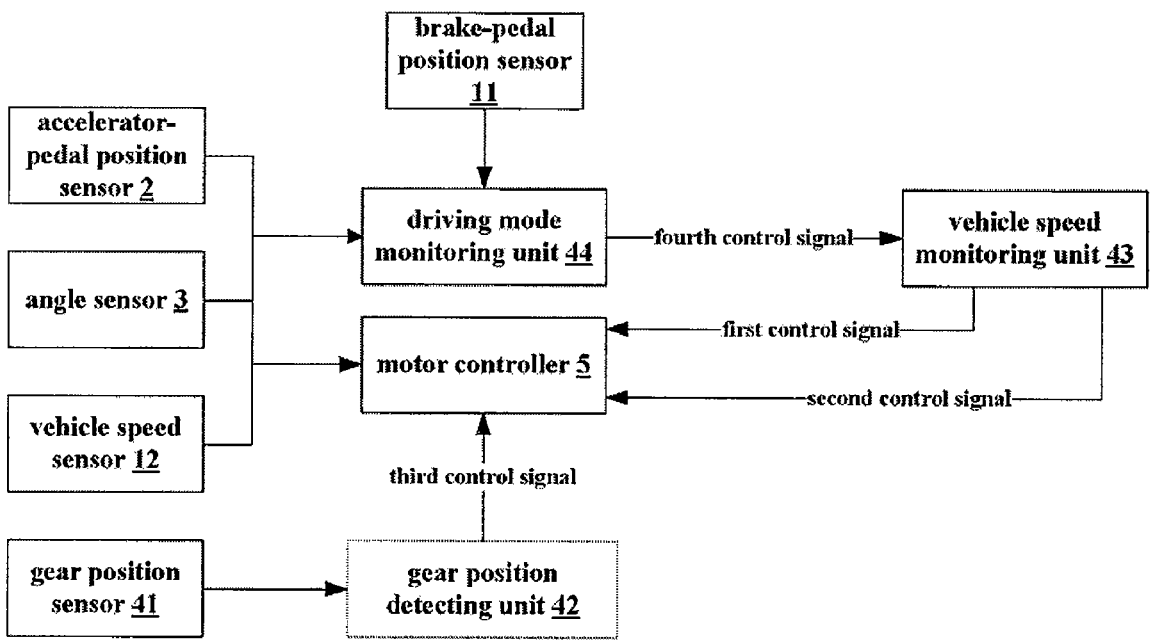
FIG. 4 is a structural block diagram of the apparatus for controlling output torque of a motor according to an embodiment in the present invention.

Shown as FIG. 2, it is a flow chart of the method for controlling output torque of a motor according to an embodiment in the present invention, comprises the following steps:

In step S1, detecting tilt angle of the vehicle by the angle sensor 3, detecting current vehicle speed by the vehicle speed sensor 12 (shown in FIG. 4), detecting position of the accelerator-pedal by the accelerator-pedal position sensor 2, and optionally detecting current gear position by the gear position sensor 41 (shown in FIG. 4). Then motor controller 5 may obtain the tilt angle value θ, the current vehicle speed value V, the accelerator-pedal travel value Gain and/or the current gear position.

In step S2, the motor controller 5 determines whether the vehicle is in downhill mode based on the title angle value θ and the current vehicle speed value V If the detected tilt angle value θ is negative and the current vehicle speed value V is positive, determining the vehicle is in downhill mode. In general, in the case that the included angle between the line from the rear end of the vehicle to its front end and the horizontal line is an obtuse angle, it is defined that the title angle value is negative, otherwise it is positive. Then if the title angle value θ is negative, it indicates that the vehicle is in downhill mode. Meanwhile, if the current vehicle speed value V is positive, then it may indicate that the vehicle is in downhill mode, not parking or backward downhill. If it is determined that the vehicle is in downhill mode, then going to step S3, otherwise going to step S4.

In step S2, the downhill mode may be further confirmed based on the current gear position, as the dashed shown in FIG. 2. According to the alternative embodiment, if the detect current gear position is at forward gear position, it illustrates that the vehicle is in downhill mode now. When detecting the current gear position, the flow of step S2 is executed as indicated by the dashed lines.

Further, the downhill mode may be determined according to another aspect. That is if the current vehicle speed V is increased but not due to stepping on the accelerator pedal (i.e., the driver does not accelerate actively), and the accelerator-pedal travel value Gain is not increased or the brake-pedal value Brake_Deep is reduced on the contrary, the situation also illustrates the vehicle is in downhill mode. This manner can be an assistant embodiment for determining.

Since the method provided in the present invention will suppress speed up, however, some drivers expect to speed up and step on the accelerator pedal, and in this situation, if still applying the strategy of the present invention, and then it will disobey the expectation of the driver. Thus, in step S2, if it is determined that the vehicle is in downhill mode and the accelerator-pedal travel value Gain is increased, which indicate the driver accelerates actively, then going to step S4 and controlling the output torque based on the actual accelerator-pedal travel value Gain.

Figure 3:
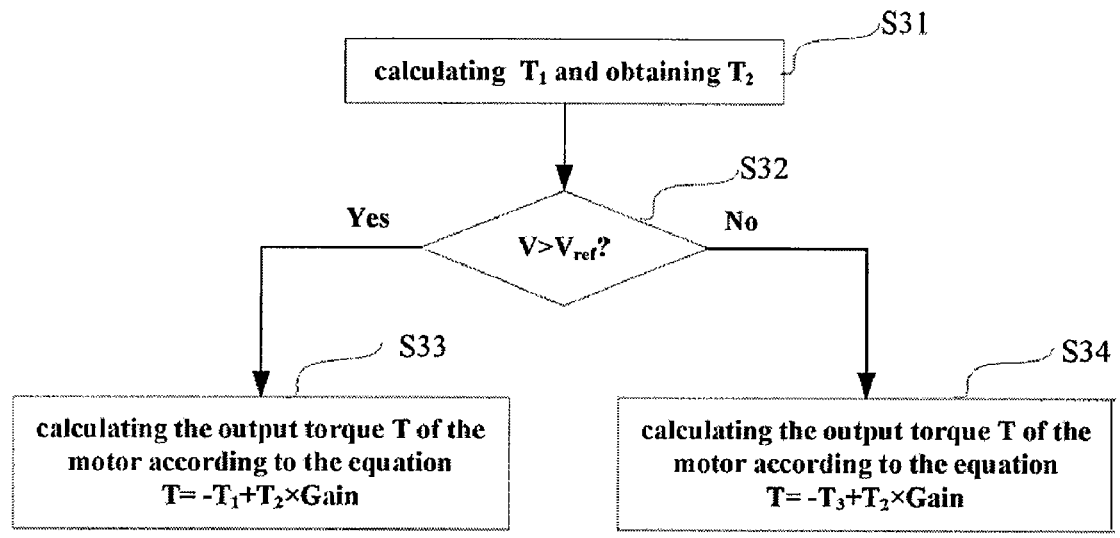
FIG. 3 is a detailed flow chart of some steps in FIG. 2.

The details of step S3 will be implemented as the flow chart shown in FIG. 3. Firstly, in step S31, calculating the downhill slip torque $T_1$ of the vehicle based on the tilt angle value $\theta$, the current vehicle speed value V and total mass m of vehicle and obtaining the maximum output torque $T_2$ of the motor under the current vehicle speed value V Wherein the downhill slip torque $T_1$ may be calculated according to the equation as follows:

$$T_1 = mg\sin\theta \times \frac{r}{k}$$

wherein m is the total mass of vehicle, g is the gravity acceleration, $\theta$ is the tilt angle value, r is the radius of wheela, and k is a variable transmission ratio of the gearbox.

The maximum output torque $T_2$ of the motor depends on the motor external performance curve. Upon different vehicle speeds, the maximum output torques of a motor are different with each other. According to the function relationship between the maximum output torque $T_2$ and the vehicle speed, upon a specified vehicle speed V, the maximum output torque $T_2$ of the motor is also a specified value. The maximum output torque $T_2$ of the motor may be founded from the external performance curve of the motor measured through experiments.

Then, in steps S32, S33 or S34, the motor controller 5 will calculate a final output torque T of the motor based on the accelerator-pedal travel value Gain, the current vehicle speed value V, the downhill slip torque $T_1$, and the maximum output torque $T_2$ of motor.

In downhill mode, the vehicle speed may be higher or lower, for high vehicle speed cases, it is expected that the vehicle speed may be not too high, for low vehicle speed case, it is expected that the vehicle speed may be stably increased to a specified given value, so in step S3, the output torque T of motor may be calculated in two states, and the details are shown as FIG. 3.

In step S32, giving a given vehicle speed delimitative value $V_{ref}$, and comparing the current vehicle speed value with the given vehicle speed delimitative value $V_{ref}$, which is a normal running speed, for example 30 km/h. If the current vehicle speed value V is greater than the given vehicle speed delimitative value $V_{ref}$, then going to step S33; or if the current vehicle speed value V is less than or equal to the given vehicle speed delimitative value $V_{ref}$, then going to step S34.

Figure 5:
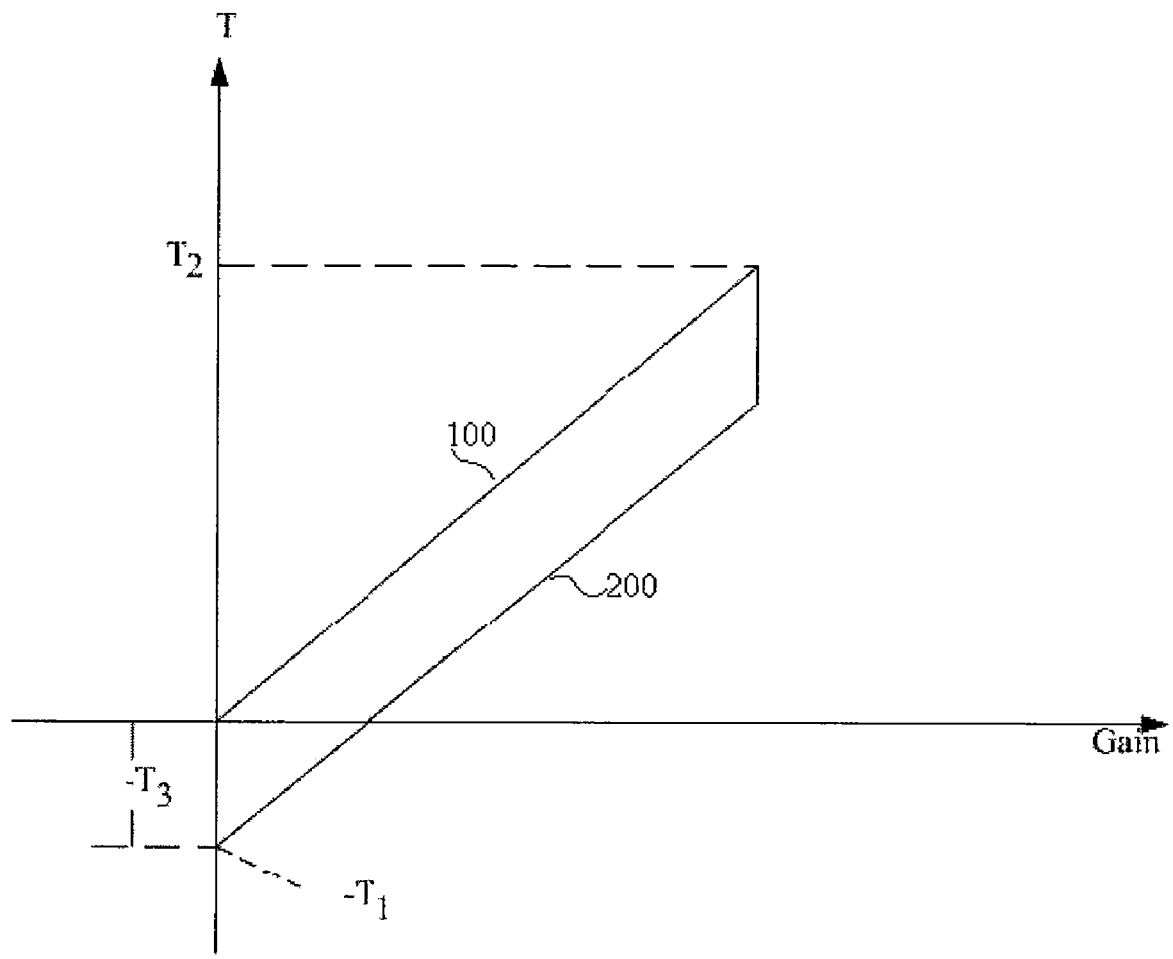
FIG. 5 illustrates a curve of output torque T vs accelerator-pedal travel value Gain under different speeds.

In step S33, according to the equation $T=-T+T_2\times Gain$, calculating the output torque T of the motor. The detailed execution method is: as shown in FIG. 5, defining output torque T as Y-axis and accelerator-pedal travel value Gain as X-axis, and drawing a linear curve 200 with $-T_1$ as a starting point and the summation $T_2-T_1$ of $T_2$ and $-T_1$ as a final point. The output torque T may be increased linearly with the increasing of accelerator-pedal travel value Gain, when the accelerator-pedal travel value Gain reaches to a maximum value 100%, the corresponding output torque T also reaches a maximum value $T_2-T_1$.

Just then, the minimum output torque of the motor is $-T_1$ and the maximum torque of the motor is $T_2-T_1$. While after adding with $T_1$, the minimum equivalent torque of wheel itself is 0, and the maximum equivalent torque is $T_2$, which may well guarantee the vehicle speed not too high.

In step S34, according to the equation $T=-T_3+T_2\times Gain$, calculating the output torque T of the motor, wherein $$T_3 = \frac{V}{V_{ref}} \times T_1.$$

The detailed embodiment is: as shown in FIG. 5, according to the equivalent torque $T_1$ due to the gravity in the forward direction, i.e. the downhill slip torque $T_1$, defining output torque T as Y-axis and accelerator-pedal travel value Gain as X-axis, and drawing a linear curve 100 with $-T_3$ as a starting point and the summation $T_2-T_3$ of the maximum output torque $T_2$ of the motor under the current vehicle speed value V and $-T_3$ as a final point. The output torque T may be increased linearly with the increasing of accelerator-pedal travel value Gain, when the accelerator-pedal travel value Gain reaches to a maximum value 100%, the corresponding output torque T also reaches a maximum value $T_2-T_3$.

Just then the minimum output torque of the motor is $-T_3$, and the maximum torque of the motor is $T_2-T_3$. While after adding with $T_1$, the minimum torque of wheels is $T_1-T_3$, i.e., $$\left(1 - \frac{V}{V_{ref}}\right) \times T_1$$

and the maximum torque of wheels is $T_2+T_1-T_3$, i.e.

$$T_2 + \left(1 - \frac{V}{V_{ref}}\right) \times T_1.$$

Just then, the vehicle speed may smoothly rise to the given vehicle speed delimitative value $V_{ref}$ (for example 30 km/h), and when the vehicle speed is beyond the given vehicle speed delimitative value $V_{ref}$, going to step S33, thereby the vehicle speed in downhill mode will be not too high.

Figure 6:
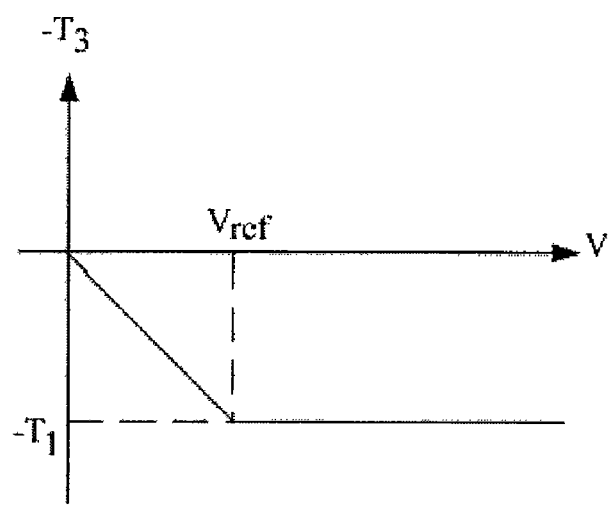
FIG. 6 illustrates a curve of output torque T vs vehicle speed V when the pedal of the accelerator is released, i.e. a curve of $T_3$ vs vehicle speed shown in FIG. 5.

In FIG. 6, $-T_3$ varies from o to $-T_1$, and the value is determined by the current vehicle speed value V and the given vehicle speed delimitative value $V_{ref}$. The line 100 in FIG. 5 is corresponding to the output torque line of vehicle under low speed in downhill mode, and the line 200 is corresponding to the output torque line of vehicle under high speed in downhill mode. Since the line 100 is above the line 200, it indicates that under a same accelerator-pedal travel value Gain, the output torque of the motor under low speed is greater than that under high speed. Thus in case of the low vehicle speed, the vehicle speed may be stably increased to a given value, when it is more than the given value, that is, when the vehicle speed is higher, the output torque of motor is decreased, and even outputting a reverse torque, corresponding to the reverse tractive and brake torque of fuel-fired vehicle engine, so that the vehicle speed will be not too high, and high safety and comfort of vehicle is guaranteed.

In step S4, corresponding to the mode that is not downhill mode or is actively acceleration mode, the motor controller 5 may calculate the output torque T of the motor according to the equation $T=T_2\times Gain$.

In step S5, the motor controller 5 may output corresponding PWM control signals according to the calculated output torque T of the motor, and output to the inverter 6 and the inverter 6 may control the motor to output the corresponding torque.

The apparatus for realizing the control method mentioned above is shown as FIG. 4, besides the angle sensor 3, the vehicle speed sensor 12, the accelerator-pedal position sensor 2, and the motor controller 5, further comprising a vehicle speed monitoring unit 43, a driving mode monitoring unit 44, a gear position sensor 41 (optional) and a gear position detecting unit 42 (optional).

The driving mode monitoring unit 44 is configured to receive the tilt angle signal from the angle sensor 3 and the vehicle speed signal from the vehicle speed sensor 12, obtain the tilt angle value θ and the current vehicle speed value V based on the signals, determine the vehicle is in downhill mode when the tilt angle value θ is negative and the current speed value V is positive, and output a fourth control signal to the vehicle speed monitoring unit 43. The vehicle speed monitoring unit 43 is configured to be acted for operating when receiving the fourth control signal.

When adopting other assistant manners for determining the downhill mode, the driving mode monitoring unit 44 is further configured the signals from the accelerator-pedal position sensor 2 or the brake-pedal position sensor 11, and the principle of determination is same with that of step S2, which will not be introduced again.

The gear position sensor 41 is for detecting gear position of the vehicle and outputting a gear position signal to a gear position detecting unit 42. And the gear position detecting unit 42 is for receiving the gear position signal, obtaining a current gear position based on the gear position signal, determining whether the current gear position is at forward gear, and outputting a third control signal to the vehicle speed monitoring unit 43 if the current gear position is at forward gear. The vehicle speed monitoring unit 43 is further configured to be acted for operating when receiving the third control signal and the fourth control signal at the same time.

The vehicle speed monitoring unit 43 is configured to receive the vehicle speed signal from the vehicle speed sensor 12, obtain the current vehicle speed value V based on the signal, compare the current vehicle speed value V with the given vehicle speed delimitative value $V_{ref}$ (preferably 30 km/h), and output a first control signal to the motor controller 5 if the current vehicle speed value V is greater than the given vehicle speed delimitative value $V_{ref}$, or output a second control signal to the motor controller 5 if the current vehicle speed value V is less than or equal to the given vehicle speed delimitative value $V_{ref}$. The motor controller 5 is further configured to, in case of determining the vehicle is in downhill mode, calculate the output torque T of the motor according to the equation $T=-T_1+T_2 \times Gain$ when receiving the first control signal, and calculate the output torque T of the motor according to the equation $T=-T_3+T_2 \times Gain$ when receiving the second control signal, wherein $$T_3 = \frac{V}{V_{ref}} \times T_1.$$

According to the preferred embodiments mentioned above, when the gear position is at forward gear and the vehicle is in downhill mode, just then, the motor controller 5 may calculate the required output torque according to the strategy of the invention, and the motor 8 may output the torque to wheels. The output torque may enable the vehicle speed not too high, and improve the vehicle safety and driving comfort.

We claim:

1. An apparatus for controlling output torque of an electric motor for an electric vehicle in a downhill mode, comprising:
   a motor controller;
   an angle sensor configured to determine a tilt angle value (θ), and output the tilt angle value (θ) to the motor controller;
   a vehicle speed sensor configured to determine a current vehicle speed value (V), and output the current vehicle speed value (V) to the motor controller;
   an accelerator-pedal position sensor configured to determine a position of an accelerator pedal, and output an accelerator-pedal travel value (Gain) to the motor controller;
   the motor controller further configured to:
   determine if the vehicle is in downhill mode based on the tilt angle value (θ), the current vehicle speed value (V), and the accelerator-pedal travel value (Gain);
   if the vehicle is in a downhill mode, then calculate a downhill slip torque ($T_1$) based on the tilt angle value (θ), obtain a maximum output torque ($T_2$) of the motor based on the current vehicle speed value (V), calculate an output torque (T) of the motor based on the downhill slip torque ($T_1$) and the maximum output torque ($T_2$) and the accelerator-pedal travel value (Gain) and a given vehicle speed delimitative value $V_{ref}$, and generate a control signal configured to control an output of the motor based on the calculated output torque (T); and
   if the vehicle is not in a downhill mode, then calculate a maximum output torque ($T_2$) of the motor based on the current vehicle speed value (V), calculate an output torque T of the motor based on the maximum output torque ($T_2$) and the accelerator-pedal travel value (Gain), and generate a control signal configured to control an output of the motor based on the calculated output torque (T).

2. The apparatus of claim 1, wherein the motor controller is configured to calculate the downhill slip torque $T_1$ according to the equation: $T_1 = mg * \sin(\theta) * (r/k)$, and wherein,
   m=total mass of the vehicle;
   g=gravitational constant;
   r=wheel radius;
   k=a variable transmission ratio of a gearbox disposed between the motor and the wheel.

3. The apparatus of claim 1, further comprising:
   a vehicle speed monitoring unit configured to receive the current vehicle speed value (V), compare the current vehicle speed value (V) with the given vehicle speed delimitative value ($V_{ref}$), and output a first control signal to the motor controller if the current vehicle speed value (V) is greater than the given vehicle speed delimitative value ($V_{ref}$), or output a second control signal to the motor controller if the current vehicle speed value (V) is less than or equal to the given vehicle speed delimitative value ($V_{ref}$); and
   wherein if the vehicle is in the downhill mode, the motor controller is configured to calculate the output torque (T) of the motor according to the equation: $T=-T_1+T_2*(Gain)$ based on the first control signal, and calculate the output torque (T) of the motor according to the equation: $T=-T_3+T_2*(Gain)$ based on the second control signal, wherein $T_3=(V/V_{ref}) \times T1$.

4. The apparatus of claim 3, wherein the given vehicle speed delimitative value ($V_{ref}$) is 30 km/h.

5. The apparatus of claim 3, further comprising a driving mode monitoring unit configured to receive the tilt angle value (θ) and the vehicle speed value (V) signal and determine that the vehicle is in downhill mode when the tilt angle value (θ) is negative and the current speed value (V) is positive, and output a fourth control signal to the vehicle speed monitoring unit; and wherein the vehicle speed monitoring unit is active when receiving the fourth control signal.

6. The apparatus of claim 5, further comprising:

a gear position sensor configured to detect a gear position of the vehicle, and output a gear position signal to a gear position detecting unit;

the gear position detecting unit configured to determine a current gear position based on the gear position signal, and determine if the current gear position is in a forward gear or a neutral gear; and output a third control signal to the vehicle speed monitoring unit if the current gear position is at forward gear; and wherein the vehicle speed monitoring unit is active when simultaneously receiving the third control signal and the fourth control signal.

7. A computer readable memory or data storage means encoded with data representing a computer program for system for controlling output torque of an electric motor for an electric vehicle in a downhill mode, the computer readable memory or data storage means causing a computer to perform the acts of:

S1) detecting a tilt angle value (θ), a current vehicle speed value (V), and an accelerator-pedal travel value (Gain) of the vehicle;

S2) determining if the vehicle is in a downhill mode;

S3) if the vehicle is in a downhill mode, then calculating a downhill slip torque ($T_1$) based on the tilt angle value (θ), obtaining a maximum output torque ($T_2$) of the motor based on the current vehicle speed value (V), calculating an output torque (T) of the motor based on the downhill slip torque ($T_1$) and the maximum output torque ($T_2$) and the accelerator-pedal travel value (Gain) and a given vehicle speed delimitative value ($V_{ref}$), and controlling an output of the motor based on the calculated output torque (T); and S4) if the vehicle is not in a downhill mode, calculating a maximum output torque ($T_2$) of the motor based on the current vehicle speed value (V), calculating an output torque T of the motor based on the maximum output torque ($T_2$) and the current vehicle speed value (V) and the accelerator-pedal travel value (Gain), and controlling an output of the motor based on the calculated output torque (T).

8. A method for controlling output torque of an electric motor for an electric vehicle in a downhill mode, comprising steps of:

S1) detecting a tilt angle value (θ), a current vehicle speed value (V), and an accelerator-pedal travel value (Gain) of the vehicle;

S2) determining if the vehicle is in a downhill mode;

S3) if the vehicle is in a downhill mode, then calculating a downhill slip torque ($T_1$) based on the tilt angle value (θ), obtaining a maximum output torque ($T_2$) of the motor based on the current vehicle speed value (V), calculating an output torque (T) of the motor based on the downhill slip torque ($T_1$) and the maximum output torque ($T_2$) and the accelerator-pedal travel value (Gain) and a given vehicle speed delimitative value ($V_{ref}$), and controlling an output of the motor based on the calculated output torque (T); and S4) if the vehicle is not in a downhill mode, calculating a maximum output torque ($T_2$) of the motor based on the current vehicle speed value (V), calculating an output torque T of the motor based on the maximum output torque ($T_2$) and the current vehicle speed value (V) and the accelerator-pedal travel value (Gain), and controlling an output of the motor based on the calculated output torque (T).

9. The method of claim 8, wherein the downhill slip minimum torque $T_1$ is calculated according to the equation: $T_1 = mg * \sin(\theta) * (r/k)$, and wherein, m=total mass of the vehicle;
g=gravitational constant;
r=wheel radius;
k=a variable transmission ratio of a gearbox disposed between the motor and the wheel.

10. The method of claim 8, wherein step S3 further includes comparing the current vehicle speed value (V) with the given vehicle speed delimitative value ($V_{ref}$), and calculating the output torque (T) of the motor according to the result of the comparison and according to the equation:

$$T = \begin{cases} -T_1 + T_2 \times \text{Gain}, & \text{if } V > V_{ref} \\ -T_3 + T_2 \times \text{Gain}, & \text{if } V < V_{ref} \end{cases}$$

wherein $T_3 = (V/V_{ref}) \times T_1$.

11. The method of claim 10, wherein the given vehicle speed delimitative value ($V_{ref}$) is 30 km/h.

12. The method of claim 8, wherein the vehicle is determined to be in the downhill mode if the tilt angle value (θ) is negative and the current vehicle speed (V) is positive.

13. The method of claim 8, further including the steps of:
detecting a current gear position of the vehicle;
performing step S3 if the vehicle is in a downhill mode and the current gear position is in a forward gear position; and
performing step S4 if the vehicle is not in a downhill mode or the current gear position is not in the forward gear position.

* * * * *